(12) United States Patent
Choi et al.

(10) Patent No.: US 11,947,543 B2
(45) Date of Patent: Apr. 2, 2024

(54) METHOD FOR QUERYING TABLES WITH DIFFERENT PARTITION INFORMATION

(71) Applicant: TmaxTibero Co., Ltd., Seongnam-si (KR)

(72) Inventors: Seonggyu Choi, Seoul (KR); Yonghwa Kim, Seongnam-si (KR); Joohyun Lee, Namyangju-si (KR); Sangyoung Park, Seoul (KR)

(73) Assignee: TmaxTibero Co., Ltd., Seongnam-si (KR)

( * ) Notice: Subject to any disclaimer, the term of this patent is extended or adjusted under 35 U.S.C. 154(b) by 0 days.

(21) Appl. No.: 17/985,034

(22) Filed: Nov. 10, 2022

(65) Prior Publication Data

US 2023/0297576 A1 Sep. 21, 2023

(30) Foreign Application Priority Data

Mar. 16, 2022 (KR) .................. 10-2022-0032482

(51) Int. Cl.
*G06F 16/20* (2019.01)
*G06F 16/22* (2019.01)
*G06F 16/2455* (2019.01)

(52) U.S. Cl.
CPC .... *G06F 16/24557* (2019.01); *G06F 16/2282* (2019.01)

(58) Field of Classification Search
CPC ............... G06F 16/278; G06F 16/2282; G06F 16/24557; G06F 16/2228; G06F 16/24554
See application file for complete search history.

(56) References Cited

U.S. PATENT DOCUMENTS

| | | | |
|---|---|---|---|
| 5,551,027 A * | 8/1996 | Choy ................. | G06F 16/2228 711/216 |
| 9,063,982 B2 | 6/2015 | Bestgen et al. | |
| 10,275,491 B2 | 4/2019 | Yi et al. | |
| 10,963,464 B2 | 3/2021 | Eadon et al. | |
| 10,983,994 B2 | 4/2021 | Li et al. | |
| 2019/0095485 A1* | 3/2019 | Bauer ................. | G06F 16/2228 |
| 2019/0391978 A1* | 12/2019 | Liu ..................... | G06F 16/2282 |
| 2022/0318223 A1* | 10/2022 | Ahluwalia .......... | G06F 16/2282 |

FOREIGN PATENT DOCUMENTS

KR 10-2017-0143470 A 12/2017

* cited by examiner

*Primary Examiner* — Vincent F Boccio
(74) *Attorney, Agent, or Firm* — Seed IP Law Group LLP

(57) ABSTRACT

Disclosed is a method for processing a query related to a plurality of partitions included in a plurality of tables having different partition information, which is performed by a computing device including one or more processors. The method includes acquiring the plurality of partitions for processing the query. The method includes acquiring global partition indexes for encompassing the acquired partitions and acquiring local partition indexes corresponding to the acquired partitions, respectively. The method includes processing the query at least partially based on the global partition indexes and the local partition indexes.

15 Claims, 9 Drawing Sheets

METHOD FOR QUERYING TABLES WITH DIFFERENT PARTITION INFORMATION

CROSS-REFERENCE TO RELATED APPLICATIONS

This application claims priority to and the benefit of Korean Patent Application No. 10-2022-0032482 filed in the Korean Intellectual Property Office on Mar. 16, 2022, the entire contents of which are incorporated herein by reference.

BACKGROUND

Technical Field

The present disclosure relates to an information processing field, and more particularly, to a method for querying tables with different partition information.

Description of the Related Art

With the development of information and communication technology, data explosively increases in companies and a government and a daily life. Therefore, a database that stores and processes data stores data of hundreds of terabytes or more, and there is a Database Management System (DBMS) for processing and managing large amounts of data.

Therefore, DBMS not only can easily manipulate and manage data per table through a data table, but also perform a relation operation including a set operation including a union, a difference set, an intersection, and a product set for different tables, and a selection operation, a projection operation, a combination operation, and a division operation.

The DBMS may also divide the tables into partitions having a predetermined range size and perform an operation task by the unit of the partition in order to solve a limit of the operation and performance deterioration for tables having a vast data capacity. In addition, the DBMS may grant a unique index to each partition in order to more quickly access the partitions.

BRIEF SUMMARY

In order to more efficiently and systematically manage large-capacity data in the related art, the DBMS may divide data into a structure of a concept called a table constituted by specified columns and rows and use the data. The table has a relationship of key including a basic key, a foreign key, etc., and a value. In addition, the table is constituted by rows (tuples) and columns also called an attribute as a field for storing any data.

As described above, the DBMS may generate a structure called the table in order to efficiently manage the database, and divide the generated table into partitions with the indexes and store the table, and perform the operation task for the data by the unit of the partition.

One or more embodiments of the present disclosure addresses one or more technical problems in the related art by improving the operations of the DBMS. For example, the present disclosure describes efficiently indexing data in an environment in which vast amount of data are simultaneously quickly varied. The method and structure of doing so is detailed in the following description.

However, technical benefits of the present disclosure are not restricted to the technical benefits mentioned as above. Other unmentioned technical benefits will be apparently appreciated by those skilled in the art by referencing to the following description.

An example embodiment of the present disclosure provides a method for processing a query related to a plurality of partitions included in a plurality of tables having different partition information, which is performed by a computing device including one or more processors. The method may include: acquiring the plurality of partitions for processing the query; acquiring global partition indexes for encompassing the acquired partitions and acquiring local partition indexes corresponding to the acquired partitions, respectively; and processing the query at least partially based on the global partition indexes and the local partition indexes.

In an example embodiment, the plurality of tables may include a first table and a second table, and a first number of partitions included in the first table and a second number of partitions included in the second table may be different from each other.

In an example embodiment, a first range of the partitions included in the first table and a second range of the partitions included in the second table may be different from each other.

In an example embodiment, the global partition indexes may be generated based on the ranges allocated to the acquired partitions, respectively.

In an example embodiment, the global partition indexes may be generated so that the total number of the global partition indexes is reduced or minimized based on the ranges of the respective local partition indexes.

In an example embodiment, the local partition indexes may be generated based on indexes pre-allocated to the plurality of partitions, and the local partition indexes may be independently generated for the plurality of tables, respectively.

In an example embodiment, the processing of the query may include processing the query based on mapping tables for mapping the global partition indexes and the local partition indexes based on range information of the global partition indexes and the local partition indexes.

In an example embodiment, the mapping tables may include a first mapping table mapping first local partition indexes corresponding to a first table among the plurality of tables, and the global partition indexes, and a second mapping table mapping second local partition indexes corresponding to a second table among the plurality of tables, and the global partition indexes.

In an example embodiment, the processing of the query may include processing at least a part of the query by using at least one local index mapped to first global partition index among the global partition indexes based on the mapping tables, and processing at least the other part of the query by using at least one local index mapped to second global partition index among the global partition indexes based on the mapping tables.

In an example embodiment, the processing of the query may include acquiring the local partition index of each of the plurality of tables corresponding to the global partition index based on the mapping table, and processing the query for local partitions corresponding to the local partition indexes mapped to the global partition.

In an example embodiment, the global partition indexes may be managed by a global partition iterator for processing the query, and the local partition indexes may be managed by a plurality of local partition iterators for accessing the plurality of tables used for processing the query.

In an example embodiment, the local partition iterators may return the local partition index to be accessed to process the query in response to the global partition index received from the global partition iterator.

Another example embodiment provides a computer program stored in a computer readable storage medium. The computer program may include instructions for processing a query related to a plurality of partitions included in a plurality of tables having different partition information by at least one processor of a computing device, and the instructions may include: an instruction of acquiring the plurality of partitions for processing the query; an instruction of acquiring global partition indexes for encompassing the acquired partitions and acquiring local partition indexes corresponding to the acquired partitions, respectively; and an instruction of processing the query at least partially based on the global partition indexes and the local partition indexes.

Still another example embodiment of the present disclosure provides a computing device for processing a query related to a plurality of partitions included in a plurality of tables having different partition information. The computing device may include at least one processor; and a storage unit, and the at least one processor may be configured to acquire the plurality of partitions for processing the query, acquire global partition indexes for encompassing the acquired partitions and acquire local partition indexes corresponding to the acquired partitions, respectively, and process the query at least partially based on the global partition indexes and the local partition indexes.

According to an example embodiment of the present disclosure, tables having different partition information can be queried.

An additional range of an applicability of the present disclosure will be apparent from the following detailed description. However, since various changes and modifications can be clearly appreciated by those skilled in the art within the spirit and the scope of the present disclosure, the detailed description and a specific embodiment such as a preferred embodiment of the present disclosure should be appreciated as being just given as an example.

Effects which can be obtained in the present disclosure are not limited to the aforementioned effects and other unmentioned effects will be clearly understood by those skilled in the art from the following description.

BRIEF DESCRIPTION OF THE SEVERAL VIEWS OF THE DRAWINGS

Various aspects are now described with reference to the drawings and like reference numerals are generally used to designate like elements. In the following example embodiments, for the purpose of description, multiple specific detailed matters are presented to provide general understanding of one or more aspects. However, it will be apparent that the aspect(s) can be executed without the specific detailed matters.

DETAILED DESCRIPTION

Figure 1:
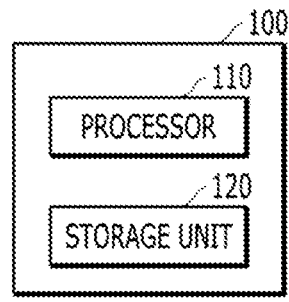
FIG. 1 is a block diagram for describing an example of a computing device according to some example embodiments of the present disclosure.

Various example embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific example aspects of one or more aspects will be described in detail. However, the aspects are example and some of various methods in principles of various aspects may be used and the descriptions are intended to include all of the aspects and equivalents thereof. Specifically, in "embodiment," "example," "aspect," "illustration," and the like used in the specification, it may not be construed that a predetermined aspect or design which is described is more excellent or advantageous than other aspects or designs.

Hereinafter, like reference numerals refer to like or similar elements regardless of reference numerals and a duplicated description thereof will be omitted. Further, in describing an example embodiment disclosed in the present disclosure, a detailed description of related known technologies will be omitted if it is determined that the detailed description makes the gist of the example embodiment of the present disclosure unclear. Further, the accompanying drawings are only for easily understanding the example embodiment disclosed in this specification and the technical spirit disclosed by this specification is not limited by the accompanying drawings.

In the present disclosure, terms expressed as N-th such as first, second, or third are used in order to distinguish at least one entity. For example, entities such as first and second may be the same as different from each other.

Although the terms "first," "second," and the like are used for describing various components, these components are not confined by these terms. These terms are merely used for distinguishing one component from another component. Therefore, a first component to be mentioned below may be a second component in a technical concept of the present disclosure.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

The term "or" is intended to mean not exclusive "or" but inclusive "or." That is, when not separately specified or not clear in terms of a context, a sentence "X uses A or B" is intended to mean one of the natural inclusive substitutions.

That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or it is not clear in terms of the context that a singular form is indicated, it should be construed that the singular form generally means "one or more" in this specification and the claims.

Further, the terms "information" and "data" used in the specification may also be often used to be exchanged with each other.

The objects and effects of the present disclosure, and technical constitutions of accomplishing these will become obvious with reference to example embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or a usual practice of a user or an operator.

However, the present disclosure is not limited to example embodiments disclosed below but may be implemented in various different forms. However, the example embodiments are provided to make the present disclosure be complete and completely announce the scope of the present disclosure to those skilled in the art to which the present disclosure belongs. Accordingly, the terms need to be defined based on contents throughout this specification.

In the present disclosure, a table may mean a form that divides data to be constituted by specified columns and rows. The table may have a relationship of key including a basic key, a foreign key, etc., and a value. In addition, the table may be constituted by rows (tuples) and columns also called an attribute as a field for storing any data. The table may be divided into partitions with indexes, and stored and managed.

In the present disclosure, the partition which partitions and divides the table into a predetermined capacity of sizes smaller than the table when a capacity of the data or table is very large, and may mean separating or storing the data in the table into files of smaller units of the table. Each partition is enabled to be independently managed, and a dedicated index may be present for each partition.

In the present disclosure, the index may mean information which enables accessing the partition corresponding to the index, which includes information of the partition corresponding to the partition. The index may include a global index which may use partitions of multiple tables as one index, a local index which is present separately for each partition of each table, etc.

In the present disclosure, query may mean an act of querying or requesting information in the database. As a language that performs the query, SQL is representatively present, and besides, TSQL, MYSQL, etc., may be present.

In the present disclosure, a computing device 100 may be a normal server. Here, the server as a system in which a user shares a network resource may be a computing environment which the user rents as necessary and uses through a network at a desired timing. The server based system may include a deployment model such as public cloud, private cloud, hybrid cloud, or community cloud or a service model such as infrastructure as a service (IaaS), platform as a service (PaaS), or software as a service (SaaS).

However, the computing device 100 in the present disclosure is not limited to the server based system, and will be enabled to be implemented according to the example embodiment of the present disclosure even in a centralized or edge computing method. Additionally, according to an implementation aspect, the computing device 100 may also be enabled to be implemented as a user terminal. Throughout the specification, the computing device 100 may mean a device that queries the data, the partition, or the table.

In the present disclosure, the computing device 100 may mean a database server. The database server may include a database management system (DBMS) and a persistent storage medium. The DBMS as a program for permitting the computing device 100 to perform predetermined types of operations of the database including retrieval, insertion, modification, and/or deletion of required data, generation of the index, and access to the index may be implemented by the processor 110 in the storage unit 120 of the computing device 100 as described above.

The persistent storage medium may mean a non-volatile storage medium which may consistently store predetermined data, such as a storage device based on a flash memory and/or a battery-backup memory in addition to a magnetic disk, an optical disk, and a magneto-optical storage device. The persistent storage medium may communicate with the processor 110 and the storage unit 120 of the computing device 100 through various communication means such as a communication unit. In an additional example embodiment, the persistent storage medium is positioned outside the computing device 100 to communicate with the computing device 100. According to an example embodiment of the present disclosure, the persistent storage medium and the memory may be collectively called a storage unit. In an additional example embodiment, the persistent storage medium may also be interchangeably used with the storage unit 120.

Hereinafter, a method and examples for querying tables having different partition information by a computing device 100 will be described through FIGS. 1 to 6.

FIG. 1 is a block diagram for describing an example of a computing device according to some example embodiments of the present disclosure.

Referring to FIG. 1, the computing device 100 may include a processor 110 and a storage unit 120. However, components described above are not required in implementing the computing device 100, so the computing device 100 may have components more or less than components listed above.

The processor 110 according to an example embodiment of the present disclosure may normally include all types of devices capable of processing an operation and data of the computing device 100. For example, the processor 110 may mean a data processing device embedded in hardware, which has a physically structurized circuit in order to perform a function expressed by a code or a command included in the program. An example of the data processing device embedded in the hardware may include a processing device such as a Microprocessor, a Central Processing Unit (CPU), a Processor core, a Multiprocessor, an Application-Specific Integrated Circuit (ASIC), A Field Programmable Gate Array (FPGA), etc., but the scope of the present disclosure is not limited thereto.

For example, the processor 110 processes a signal or data input or output through the communication unit of the computing device 100 or stores or deletes the data in or from the storage unit 120 to manage or process the data. Specifically, when querying the table, the processor 110 may acquire a partition for processing the query and/or data including the partition or corresponding to the partition, and acquire a program or data for a process for querying the table. In addition, the processor 110 may store the partition for processing the query and/or the data including the partition or corresponding to the partition in the storage unit 120. For example, a data structure including data of a table for query, a node included in the data structure, a relationship between the nodes, an operation task executed for the index, and/or information acquired or changed by the operation task may be stored. Further, the storage unit 120 stores data or cache data related to a program for querying the table, and the present disclosure is not limited thereto. That is, the processor 110 controls an entire process of querying the table including the above process, and the present disclosure is not limited thereto.

In an additional example embodiment of the present disclosure, the storage unit 120 may be included in another computing device (e.g., another server or another user terminal) separately from the computing device 100. In this case, the computing device 100 communicates with another computing device to acquire desired data from the storage unit 120 included in another computing device. For example, a database management server (not illustrated) including the storage unit 120 may be present separately from the computing device 100, and the computing device 100 may acquire required data from the database management server in performing the method according to the example embodiments of the present disclosure.

The storage unit 120 according to an example embodiment of the present disclosure may include a memory and/or a persistent storage medium. The memory may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk, but the scope of the present disclosure is not limited thereto.

Figure 2:
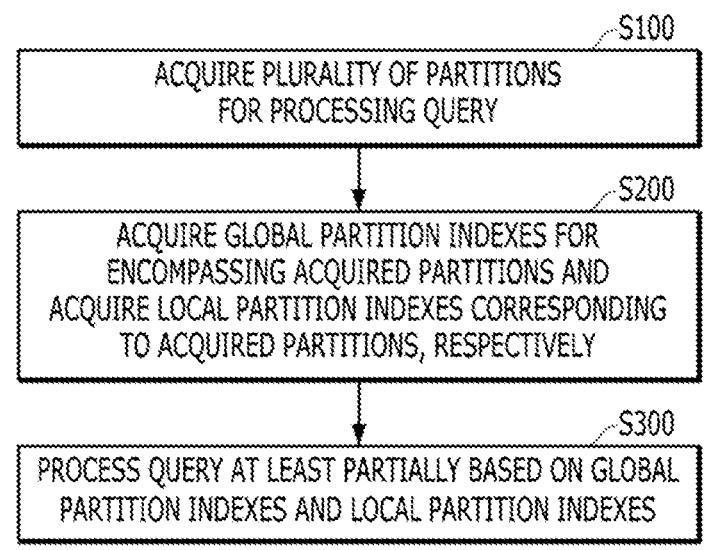
FIG. 2 is a flowchart of a method of an example of querying tables having different partition information of a computing device according to some example embodiments of the present disclosure.

FIG. 2 is a flowchart of a method of an example of querying tables having different partition information of a computing device according to some example embodiments of the present disclosure.

Referring to FIG. 2, in step S100, the computing device 100 may acquire a plurality of tables or partitions for processing the query. In an example embodiment, the plurality of acquired partitions may mean partitions included in the plurality of tables having different partition information. In addition, the plurality of tables having different partition information may mean a plurality of tables in which the number of partitions is different according to the table and/or a data range of the partition is different according to the table.

In step S200, the computing device 100 may acquire global partition indexes for encompassing the partitions acquired in step S100 and acquire local partition indexes corresponding to the acquired partitions, respectively. In the present disclosure, the global partition index may mean an index in which a total number is minimum based on the number or ranges of local partitions in order for the computing device 100 to access the partition, which is managed by a global partition iterator. In addition, the local partition index may mean data that means information including a position of actual data which each partition has in the storage unit 120, which is independently present for each table. In addition, the computing device 100 may include a mapping table in which the global partition index and the local partition index are mapped to correspond based on range information of the global partition index and the local partition index, the numbers of global partition indexes and local partition indexes, and/or range information of the partitions and the number of partitions. In an example embodiment, each mapping table may be included in each corresponding table or and/or stored in a separate storage space.

In step S300, the computing device 100 may process the query at least partially based on the global partition indexes and the local partition indexes. Specifically, the computing device 100 may perform query operations such as a joint operation, a set operation (union, intersect, minus, etc.), etc., for tables in which partition states such as the partition number and/or range are different through steps S100 to S300.

In the present disclosure, a specific method for processing the query at least partially based on the global partition indexes and the local partition indexes by the computing device 100 will be described in detail through FIGS. 3 to 5.

FIGS. 3A, 3B, 3C, and 3D are examples of an illustration for describing a method for querying tables having different partition numbers according to some example embodiments of the present disclosure. Specifically, FIGS. 3A, 3B, 3C, and 3D are examples of an illustration for describing a method for querying tables having different numbers of partitions. In an example embodiment, technical features of the present disclosure illustrated in FIGS. 3A, 3B, 3C, and 3D may be performed by the computing device 100.

Referring to FIGS. 3A, 3B, 3C, and 3D, in order to query tables (e.g., a first table 50 and a second table 60) having different partition numbers, the computing device 100 may include a global partition iterator 10 including the global partition index, a query operator 20 including information for performing the query in the tables, a first local partition iterator 30 including and managing information on the local partition index corresponding to the first table 50, and a second local partition iterator 40 including information on the local partition index corresponding to the second table 60. It will be apparent to those skilled in the art that the table, the partition, the iterator, the index, and the operator referred in the present disclosure are just example components for describing an example embodiment of the method for querying the table having different partition information, and the method for querying the table having different partition information may include various components and/or a combination of the components not specified in the present disclosure.

The first table 50 and the second table 60 according to an example embodiment may mean tables in which ranges of data which partitions included in each table have correspond to each other, but the number of partitions is different. For example, in the first table 50 and the second table 60, a size of the range of the data of the partition may be 10. In addition, for example, the first table 50 may include a total of 4 (first number) including partition 1 (including a range of 1 to 10), partition 2 (including a range of 11 to 20), partition 3 (including a range of 21 to 30), and partition 4 (including a range of 31 to 40), and the second table 60 may include two (second number) including partition 2 (including a range of 11 to 20) and partition 3 (including a range of 21 to 30). In addition, the global partition iterator 10 may generate global partition indexes 1, 2, 3, and 4 which are a union of the partition of the first table 50 and the partition of the second table 60 so that the total number of global partition indexes is reduced or minimized based on the range of the partition included in the tables and/or the first number and the second number.

The first local partition iterator 30 according to an example embodiment may include a first mapping table 51 which includes local partition indexes 1, 2, 3, and 4 corresponding to the first table, and in which the local partition index corresponding to the first table and global partition indexes 1, 2, 3, and 4 are mapped to correspond to each other. Similarly, the second local partition iterator 40 may include a second mapping table 61 which includes local partition indexes 1 and 2 corresponding to the second table, and in which the local partition index corresponding to the second table and global partition indexes 1, 2, 3, and 4 are mapped to correspond to each other.

In an example embodiment, the query operator 20 may include the join operation. The join operation may mean an operation of combining the plurality of tables in order to acquire desired information by the computing device 100. When the query operator 20 acquires data through the join operation, the plurality of tables may be reconfigured as one table, which includes at least a part of a union of a value acquired by combining redundant values in the plurality of tables into one value and the remaining values. In addition, the join operation may include operations of sub-concepts such as an equal join, an external join, an internal join, etc.

In an example embodiment, the computing device 100 may process the corresponding query by using the iterator and the operator for each of the global partition indexes, and processing methods of the queries for the respective global partition indexes are illustrated in FIGS. 3A, 3B, 3C, and 3D, respectively.

Figure 3A:
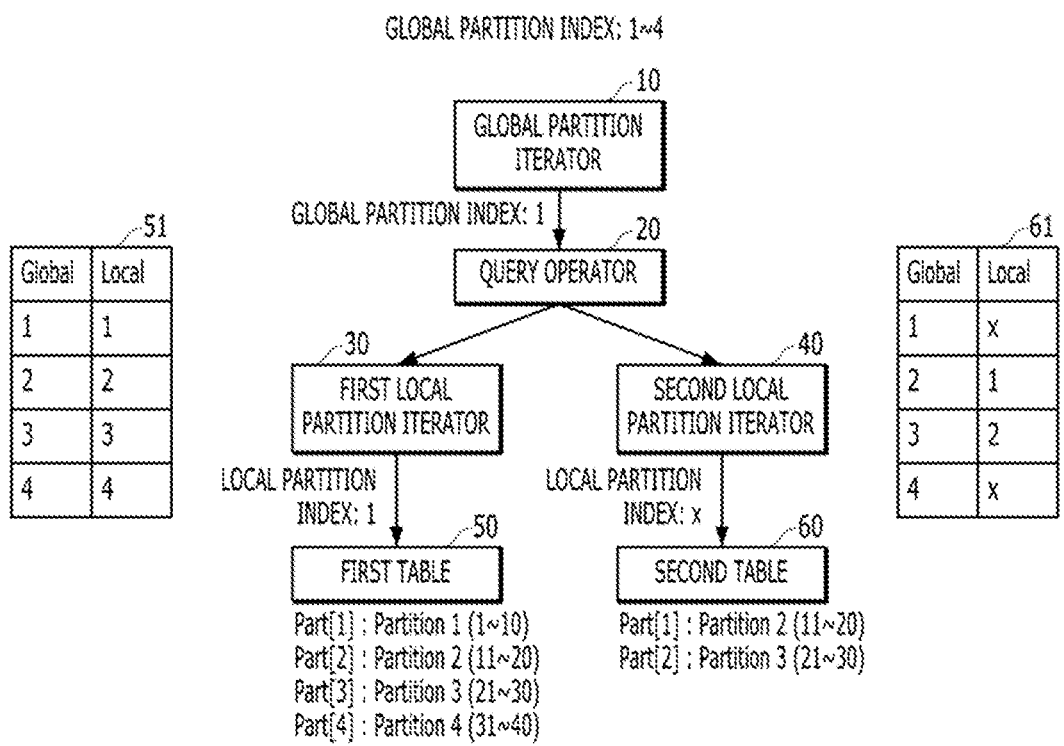
FIGS. 3A, 3B, 3C, and 3D are examples of an illustration for describing a method for querying tables having different partition information according to some example embodiments of the present disclosure.

In an example embodiment, referring to FIG. 3A, the global partition iterator 10 may deliver global partition index 1 to the query operator 20. In addition, the query operator 20 may deliver global partition index 1 to a first local partition iterator 30 and a second local partition iterator 40, and receive data corresponding to global partition index 1 included in each table from each table. Specifically, the first local partition iterator 30 may deliver, to a first table 50, local partition index 1 corresponding to global partition index 1 based on the first mapping table 51, and the first table 50 deliver, to the query operator 20, partition 1 corresponding to local partition index 1. In addition, the second local partition iterator 40 may identify that there is no local partition index corresponding to global partition index 1 based on the second mapping table 61, and deliver, to the query operator 20, a NULL value or information indicating that there is no data corresponding to global partition index 1.

Figure 3B:
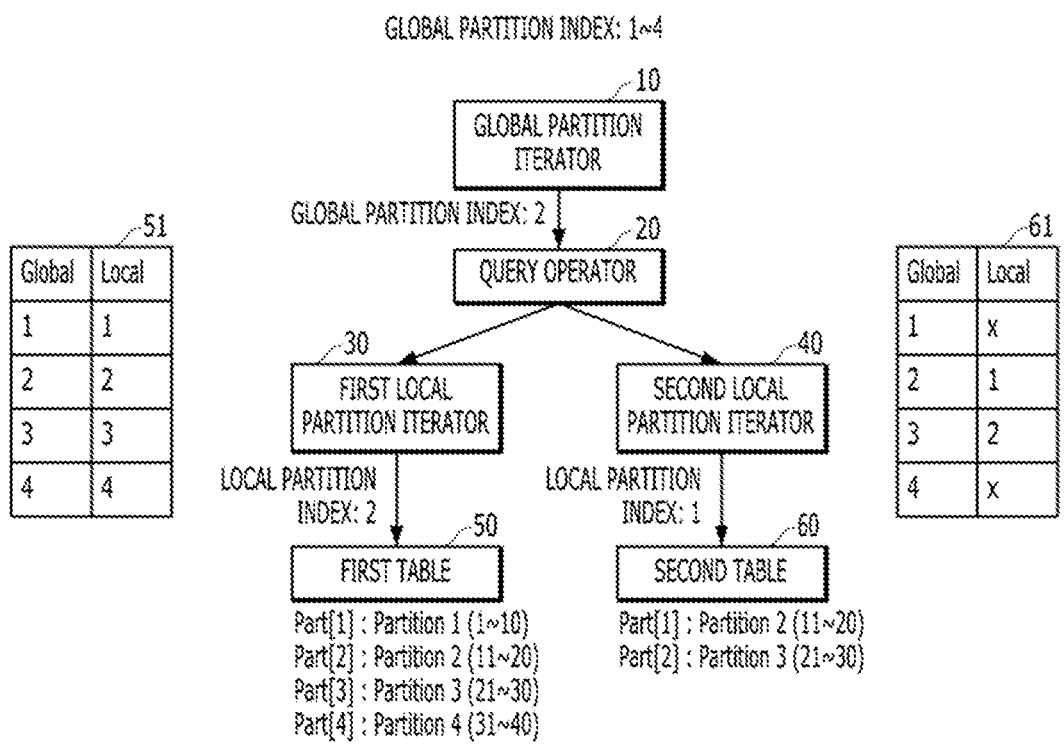

In an example embodiment, referring to FIG. 3B, the global partition iterator 10 may deliver global partition index 2 to the query operator 20. In addition, the query operator 20 may deliver global partition index 2 to the first local partition iterator 30 and the second local partition iterator 40, and receive data corresponding to global partition index 2 included in each table from each table. Specifically, the first local partition iterator 30 may deliver, to the first table 50, local partition index 2 corresponding to global partition index 2 based on the first mapping table 51, and the first table 50 may deliver, to the query operator 20, partition 2 corresponding to local partition index 2. In addition, the second local partition iterator 40 may deliver, to the second table 60, local partition index 1 corresponding to global partition index 2 based on the second mapping table 61, and the second table 60 may deliver, to the query operator 20, partition 2 corresponding to local partition index 1.

Figure 3C:
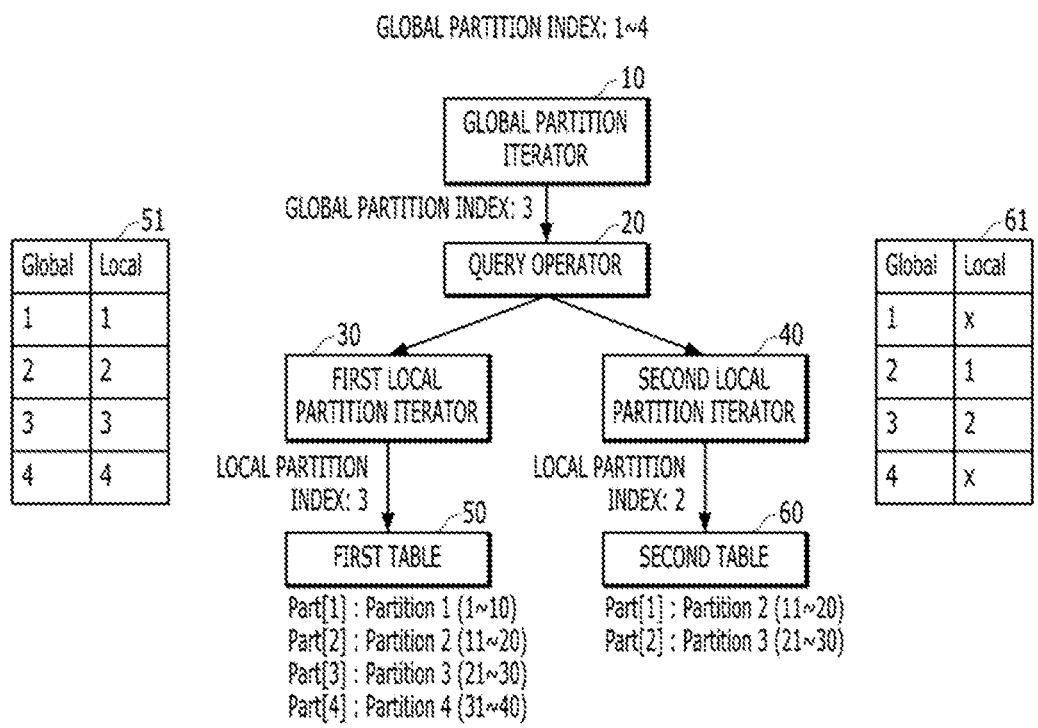

In an example embodiment, referring to FIG. 3C, the global partition iterator 10 may deliver global partition index 3 to the query operator 20. In addition, the query operator 20 may deliver global partition index 3 to the first local partition iterator 30 and the second local partition iterator 40, and receive data corresponding to global partition index 3 included in each table from each table. Specifically, the first local partition iterator 30 may deliver, to the first table 50, local partition index 3 corresponding to global partition index 3 based on the first mapping table 51, and the first table 50 may deliver, to the query operator 20, partition 3 corresponding to local partition index 3. In addition, the second local partition iterator 40 may deliver, to the second table 60, local partition index 2 corresponding to global partition index 3 based on the second mapping table 61, and the second table 60 may deliver, to the query operator 20, partition 3 corresponding to local partition index 2.

Figure 3D:
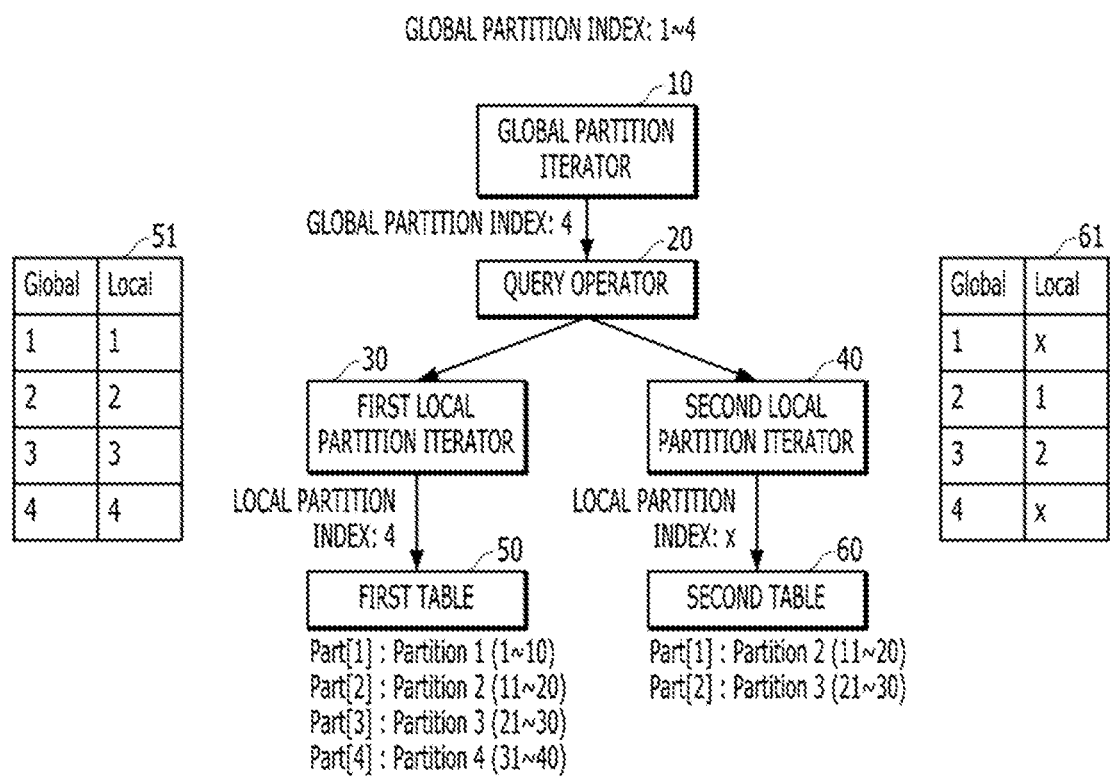

In an example embodiment, referring to FIG. 3D, the global partition iterator 10 may deliver global partition index 4 to the query operator 20. In addition, the query operator 20 may deliver global partition index 4 to the first local partition iterator 30 and the second local partition iterator 40, and receive data corresponding to global partition index 4 included in each table from each table. Specifically, the first local partition iterator 30 may deliver, to the first table 50, local partition index 4 corresponding to global partition index 4 based on the first mapping table 51, and the first table 50 may deliver, to the query operator 20, partition 4 corresponding to local partition index 4. In addition, the second local partition iterator 40 may identify that there is no local partition index corresponding to global partition index 4 based on the second mapping table 61, and deliver, to the query operator 20, a NULL value or information indicating that there is no data corresponding to global partition index 1.

A process of querying tables having different partition numbers is not limited to the methods disclosed in FIGS. 3A to 3D, and may include a process which is not disclosed. In addition, the tables and partitions disclosed in FIGS. 3A to 3D are just examples, and the computing device 100 may perform simultaneous query for the corresponding tables even when the numbers of partitions included in the tables, which are not disclosed are different and various.

Figure 4A:
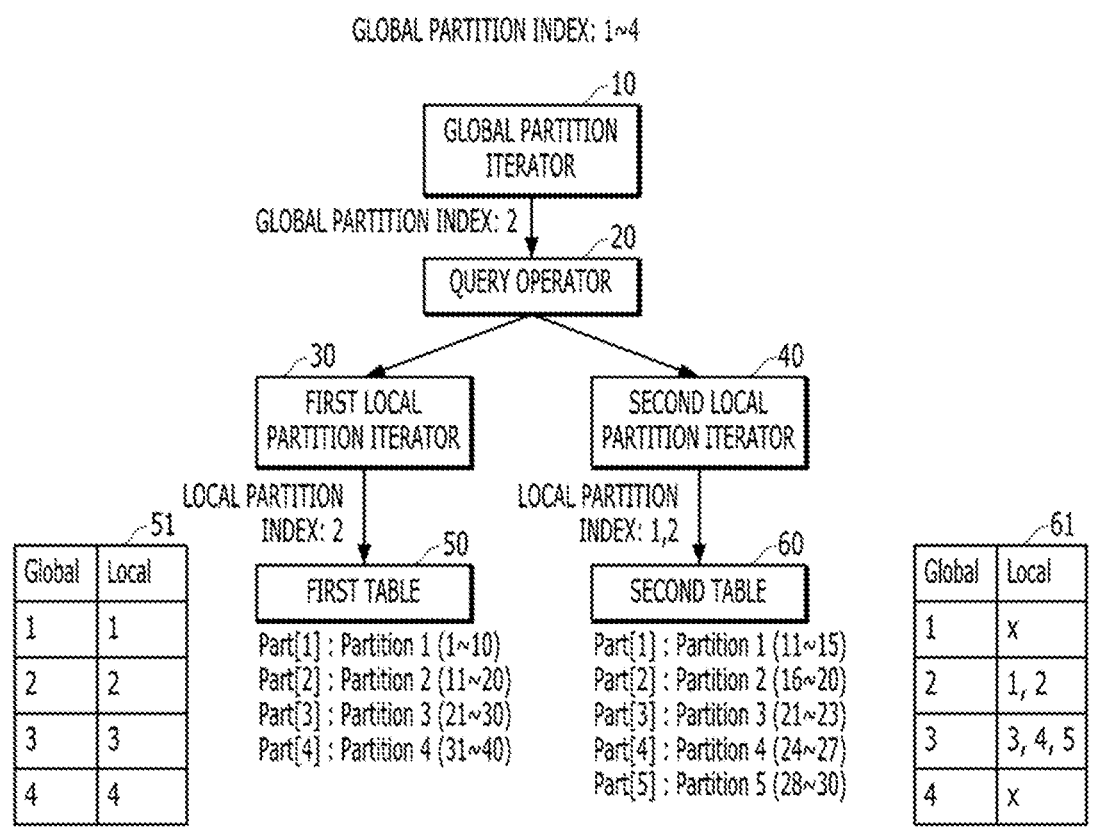
FIGS. 4A and 4B are examples of an illustration for describing a method for querying tables having different partition information according to some example embodiments of the present disclosure.
Figure 4B:
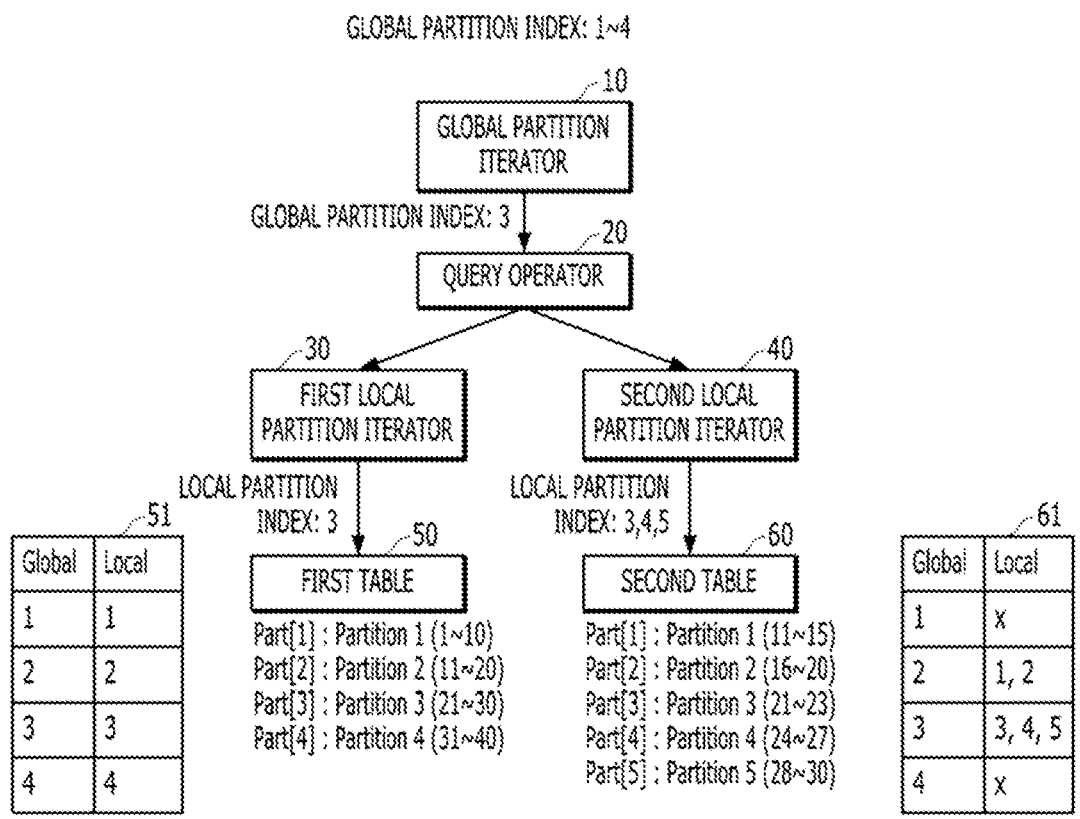

FIGS. 4A and 4B are examples of an illustration for describing a method for querying tables having different partition information according to some example embodiments of the present disclosure. Specifically, FIGS. 4A and 4B are examples of illustration for describing the method for querying partitions having different ranges. In an example embodiment, technical features of the present disclosure illustrated in FIGS. 4A and 4B may be performed by the computing device 100.

Referring to FIGS. 4A and 4B, in order to query tables including partitions having different ranges, the computing device 100 may include a global partition iterator 10 including the global partition index, a query operator 20 including information for performing the query in the tables, a first local partition iterator 30 including information on the local partition index corresponding to the first table 50, and a second local partition iterator 40 including information on the local partition index corresponding to the second table 60.

The first table 50 and the second table 60 according to an example embodiment may mean tables in which ranges of data which partitions included in each table have are different and the number of partitions is also different. In addition, for example, the first table 50 may include a total of four (first number) including partition 1 (including a range of 1 to 10) in which the range of the partition is 10 (first range), partition 2 (including a range of 11 to 20), partition 3 (including a range of 21 to 30), and partition 4 (including a range of 31 to 40), and the second table 60 may include five (second number) including partition 1 (including a range of 11 to 15) in which the range of the partition is 3 to 5 (second range), partition 2 (including a range of 16 to 20), partition 3 (including a range of 21 to 23), partition 4 (including a range of 24 to 27), and partition 5 (including a range of 28 to 30). In addition, the global partition iterator 10 may generate global partition indexes 1, 2, 3, and 4 based on the first range, the second range, and/or the first number, and the second number. The global partition index may be generated to include ranges of all partitions included in the table.

The first local partition iterator 30 according to an example embodiment may include a first mapping table 51 which includes local partition indexes 1, 2, 3, and 4 corresponding to the first table 50, and in which the local partition index corresponding to the first table 50 and global partition indexes 1, 2, 3, and 4 are mapped to correspond to each other. Similarly, the second local partition iterator 40 according to an example embodiment may include a second mapping table 61 which includes local partition indexes 1, 2, 3, 4, and 5 corresponding to the second table 60, and in which the local partition index corresponding to the second table 60 and global partition indexes 1, 2, 3, and 4 are mapped to correspond to each other.

In an example embodiment, referring to FIG. 4A, the global partition iterator 10 may deliver global partition index 1 to the query operator 20. In addition, the query operator 20 may deliver global partition index 1 to the first local partition iterator 30 and the second local partition iterator 40, and receive data corresponding to global partition index 1 included in each table from each table. Specifically, the first local partition iterator 30 may deliver, to the first table 50, local partition index 1 corresponding to global partition index 1 based on the first mapping table 51, and the first table 50 may deliver, to the query operator 20, partition 1 corresponding to local partition index 1. In addition, the second local partition iterator 40 may identify that there is no local partition index corresponding to global partition index 1 based on the second mapping table 61, and deliver, to the query operator 20, a NULL value or information indicating that there is no data corresponding to global partition index 1.

The global partition iterator 10 may deliver global partition index 2 to the query operator 20. In addition, the query operator 20 may deliver global partition index 2 to the first local partition iterator 30 and the second local partition iterator 40, and receive data corresponding to global partition index 2 included in each table from each table. Specifically, the first local partition iterator 30 may deliver, to the first table 50, local partition index 2 corresponding to global partition index 2 based on the first mapping table 51, and the first table 50 deliver, to the query operator 20, partition 2 corresponding to local partition index 2. In addition, the second local partition iterator 40 may deliver, to the second table 60, local partition indexes 1 and 2 corresponding to global partition index 2 based on the second mapping table 61, and the second table 60 may deliver, to the query operator 20, partitions 1 and 2 corresponding to local partition indexes 1 and 2.

In an example embodiment, referring to FIG. 4B, the global partition iterator 10 may deliver global partition index 3 to the query operator 20. In addition, the query operator 20 may deliver global partition index 3 to the first local partition iterator 30 and the second local partition iterator 40, and receive data corresponding to global partition index 3 included in each table from each table. Specifically, the first local partition iterator 30 may deliver, to the first table 50, local partition index 3 corresponding to global partition index 3 based on the first mapping table 51, and the first table 50 may deliver, to the query operator 20, partition 3 corresponding to local partition index 3. In addition, the second local partition iterator 40 may deliver, to the second table 60, local partition indexes 3, 4, and 5 corresponding to global partition index 3 based on the second mapping table 61, and the second table 60 may deliver, to the query operator 20, partitions 3, 4, and 5 corresponding to local partition indexes 3, 4, and 5.

The global partition iterator 10 may deliver global partition index 4 to the query operator 20. In addition, the query operator 20 may deliver global partition index 4 to the first local partition iterator 30 and the second local partition iterator 40, and receive data corresponding to global partition index 4 included in each table from each table. Specifically, the first local partition iterator 30 may deliver, to the first table 50, local partition index 4 corresponding to global partition index 4 based on the first mapping table 51, and the first table 50 deliver, to the query operator 20, partition 4 corresponding to local partition index 4. In addition, the second local partition iterator 40 may identify that there is no local partition index corresponding to global partition index 4 based on the second mapping table 61, and deliver, to the query operator 20, a NULL value or information indicating that there is no data corresponding to global partition index 4.

A process of querying tables having different ranges of partitions is not limited to the methods disclosed in FIGS. 4A and 4B, and may include a process which is not disclosed. In addition, the tables and partitions disclosed in FIGS. 4A and 4B are just examples, and the computing device 100 may perform simultaneous query for the corresponding tables even when the numbers of partitions included in the tables and/or ranges of the partitions, which are not disclosed are different and various.

Figure 5:
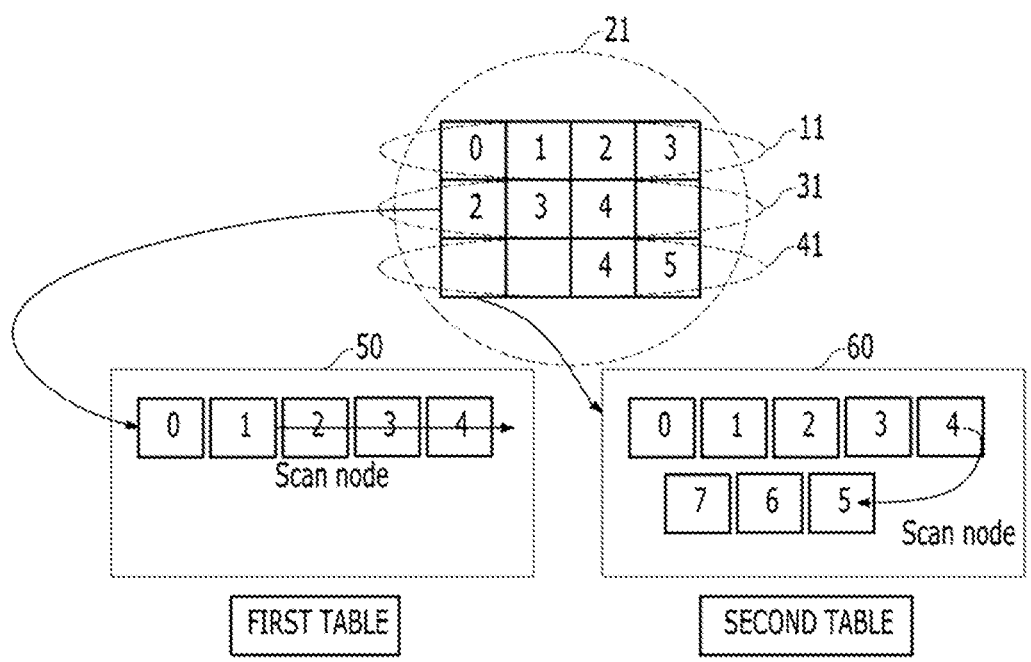
FIG. 5 is an example of an illustration for describing a method for querying tables having different partition information according to some example embodiments of the present disclosure.

FIG. 5 is an example of an illustration for describing a method for querying tables having different partition information according to some example embodiments of the present disclosure. The method illustrated in FIG. 5 may be performed by the computing device 100, for example.

In an example embodiment, referring to FIG. 5, the computing device 100 may include a global mapping table 21 mapping the global partition index 11, and the fist local partition index 31 including local partition index information of all tables for querying the query, e.g., indexes corresponding to the partitions of the first table 50 in each column and the second local partition index 41 including the indexes corresponding to the partitions of the second table 60 in each column, for querying the tables (e.g., the first table and the second table) having different partition information. Specifically, each row of the mapping table 21 may correspond to all global partition indexes or all local partition indexes, and each column may correspond to an individual index value of the global partition index or an individual index value of the local partition index. In addition, the global mapping table 21 may be stored in a separate storage space from performing the query, and may also be included in the table for querying or the local partition iterator of the table.

In an example embodiment, the global mapping table 21 may be a form in which the global partition index 11 is disposed in a first row which is a top. In addition, the global mapping table 21 may be a form in which other local partition indexes are disposed in rows below the global partition index 11. For example, the first local partition index 31 may be disposed in a row immediately below the global partition index 11. In addition, the second local partition index 41 may be disposed below the first local partition index 31. Specifically, the local partition index may be disposed so that values corresponding to the local partition indexes included in each column of the local partition indexes correspond to the global partition index 11. For example, the global mapping table 21 may be a form in which the first local partition index 31 2 corresponding to the global partition index 11 0 among the global partition indexes 11 0, 1, 2, and 3 generated to include and reduce or minimize all local partitions is disposed in a column including 0 and may be a form in which since there is no local partition index corresponding to the second table 60, a column including 0 of the first global partition index 11 of the second local partition index 41 is left as an empty space. Similarly, the global mapping table 21 may be a form in which a column including global partition indexes 11 1, 2, and 3 includes partition indexes of the first table 50 and the second table 60, respectively corresponding to the global partition index 11.

In an example embodiment, the computing device 100 may deliver, to the first table 50, 2 of the first local partition index 31 corresponding to 0 of the global partition index 11 by referring to the global mapping table 21, and the first table 50 may return the partition corresponding to 2 of the first local partition index 31 to the query operator 20 for performing the query (by referring to FIGS. 3 and 4). In addition, since the second local partition index 41 corresponding to 0 of the global partition index 11 is not present, the computing device 100 may not perform query for the second table 60 or acquisition of the partition of the second table 60.

After performing a process of acquiring the partition for 0 of the global partition index 11, the computing device 100 may deliver, to the first table 50, 3 of the first local partition index 31 corresponding to 1 of the global partition index 11 by referring to the global mapping table 21, and the first table 50 may return the partition of the first table 50 corresponding to 3 of the first local partition index 31 to the query operator 20 for performing the query (by referring to FIGS. 3 and 4). In addition, since the second local partition index 41 corresponding to 1 of the global partition index 11 is not present, the computing device 100 may not perform query for the second table 60 or acquisition of the partition of the second table 60.

After performing a process of acquiring the partition for 1 of the global partition index 11, the computing device 100 may deliver, to the first table 50, 4 of the first local partition index 31 corresponding to 2 of the global partition index 11 by referring to the global mapping table 21, and the first table 50 may return the partition of the first table 50 corresponding to 4 of the first local partition index 31 to the query operator 20 for performing the query (by referring to FIGS. 3 and 4). In addition, the computing device 100 may return the partition of the second table 60 corresponding to 4 of the second local partition index 41 corresponding to 2 of the global partition index 11 to the query operator 20 for performing the query (by referring to FIGS. 3 and 4).

After performing a process of acquiring the partition for 2 of the global partition index 11, the computing device 100 may identify that the first local partition index 31 corresponding to 3 of the global partition index 11 is not present by referring to the global mapping table 21, and the computing device 100 may not perform the query for the first table 50 or acquisition of the partition of the first table 50. In addition, the computing device 100 may return the partition corresponding to 5 of the second local partition index 41 corresponding to 3 of the global partition index 11 to the query operator 20 for performing the query (by referring to FIGS. 3 and 4).

According to an example embodiment of the present disclosure, the computing device 100 acquires the index of the corresponding local partition according to the order of the global partition index 11 through a scan node to access the local partition corresponding to the acquired local partition index.

Figure 6:
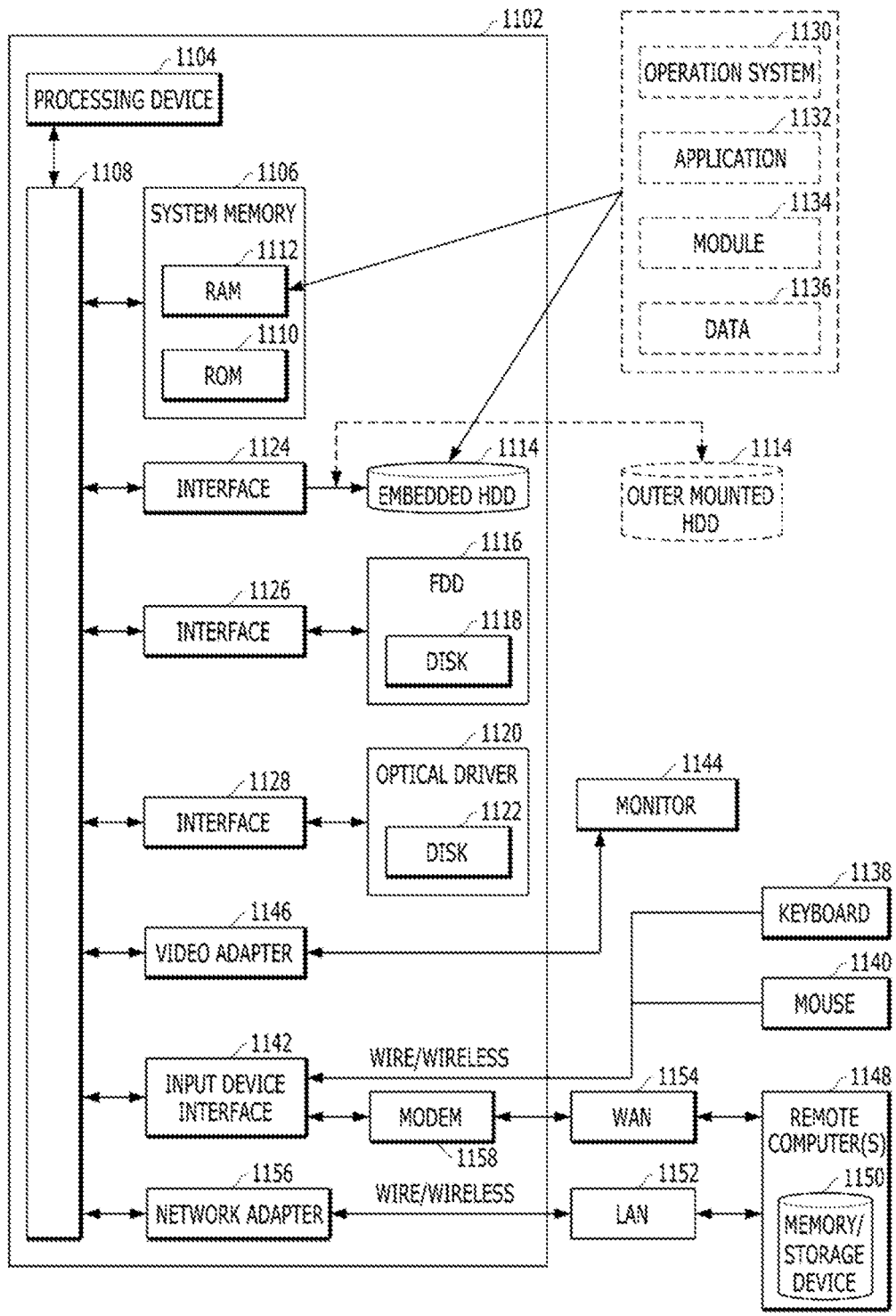
FIG. 6 is a normal schematic view of an example computing environment in which the example embodiments of the present disclosure may be implemented.

FIG. 6 is a normal schematic view of an example computing environment in which the example embodiments of the present disclosure may be implemented.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The example embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the example embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various example embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented example embodiments is provided so as for those skilled in the art to use or carry out the present disclosure. Various modifications of the example embodiments may be apparent to those skilled in the art, and general principles defined herein may be applied to other example embodiments without departing from the scope of the present disclosure. Accordingly, the present disclosure is not limited to the example embodiments suggested herein, and shall be interpreted within the broadest meaning range consistent to the principles and new characteristics presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for processing a query related to a plurality of partitions included in a plurality of tables having different partition information, which is performed by a computing device including one or more processors, the method comprising:

acquiring, by the one or more processors, the plurality of partitions for processing the query;

acquiring, by the one or more processors, global partition indexes for encompassing the acquired partitions and acquiring local partition indexes corresponding to the acquired partitions, respectively; and processing, by the one or more processors, the query at least partially based on the global partition indexes and the local partition indexes;

wherein the plurality of tables includes a first table and a second table, and a first number of partitions included in the first table and a second number of partitions included in the second table are different from each other, wherein a first range of the partitions included in the first table and a second range of the partitions included in the second table are different from each other;

wherein the global partition indexes are generated based on the ranges allocated to the acquired partitions, respectively, and wherein the global partition indexes are generated so that the total number of the global partition indexes is reduced based on the ranges of the respective local partition indexes.

2. The method of claim 1, wherein the local partition indexes are generated based on indexes pre-allocated to the plurality of partitions, and wherein the local partition indexes are independently generated for the plurality of tables, respectively.

3. The method of claim 1, wherein the processing of the query includes processing the query based on mapping tables for mapping the global partition indexes and the local partition indexes based on range information of the global partition indexes and the local partition indexes.

4. The method of claim 3, wherein the mapping tables include:

a first mapping table mapping first local partition indexes corresponding to a first table among the plurality of tables, and the global partition indexes, and a second mapping table mapping second local partition indexes corresponding to a second table among the plurality of tables, and the global partition indexes.

5. The method of claim 3, wherein the processing of the query includes:

processing at least a part of the query by using at least one local index mapped to first global partition index among the global partition indexes based on the mapping tables, and processing at least the other part of the query by using at least one local index mapped to second global partition index among the global partition indexes based on the mapping tables.

6. The method of claim 3, wherein the processing of the query includes:

acquiring the local partition index of each of the plurality of tables corresponding to the global partition index based on the mapping table, and processing the query for local partitions corresponding to the local partition indexes mapped to the global partition.

7. The method of claim 1, wherein the global partition indexes are managed by a global partition iterator for processing the query, and wherein the local partition indexes are managed by a plurality of local partition iterators for accessing the plurality of tables used for processing the query.

8. The method of claim 7, wherein the local partition iterators return the local partition index to be accessed to process the query in response to the global partition index received from the global partition iterator.

9. The method of claim 1, wherein the global partition indexes are generated so that the total number of the global partition indexes is minimized based on the ranges of the respective local partition indexes.

10. The method of claim 1, wherein the total number of global partition indexes is minimized based on the first number of partitions and the second number of partitions.

11. The method of claim 1, wherein a global mapping table is generated based on the global partition indexes and the local partition indexes.

12. A non-transitory computer readable medium including a computer program, wherein the computer program includes instructions for processing a query related to a plurality of partitions included in a plurality of tables having different partition information by at least one processor of a computing device, and the instructions include:

acquiring, by the at least one processor, the plurality of partitions for processing the query;

acquiring, by the at least one processor, global partition indexes for encompassing the acquired partitions and acquiring local partition indexes corresponding to the acquired partitions, respectively; and processing, by the at least one processor, the query at least partially based on the global partition indexes and the local partition indexes, wherein the plurality of tables includes a first table and a second table, and a first number of partitions included in the first table and a second number of partitions included in the second table are different from each other;

wherein a first range of the partitions included in the first table and a second range of the partitions included in the second table are different from each other;

wherein the global partition indexes are generated based on the ranges allocated to the acquired partitions, respectively; and wherein the global partition indexes are generated so that the total number of the global partition indexes is reduced based on the ranges of the respective local partition indexes.

13. A computing device for processing a query related to a plurality of partitions included in a plurality of tables having different partition information, the computing device comprising:

at least one processor; and a storage unit, wherein the at least one processor is configured to:

acquire, by the at least one processor, the plurality of partitions for processing the query, acquire, by the at least one processor, global partition indexes for encompassing the acquired partitions and acquire local partition indexes corresponding to the acquired partitions, respectively, and process, by the at least one processor, the query at least partially based on the global partition indexes and the local partition indexes;

wherein the plurality of tables includes a first table and a second table, and a first number of partitions included in the first table and a second number of partitions included in the second table are different from each other;

wherein a first range of the partitions included in the first table and a second range of the partitions included in the second table are different from each other;

wherein the global partition indexes are generated based on the ranges allocated to the acquired partitions, respectively; and wherein the global partition indexes are generated so that the total number of the global partition indexes is reduced based on the ranges of the respective local partition indexes.

14. The method of claim 1, wherein each value in a row of the global mapping table corresponds to a local partition index.

15. The method of claim 11, wherein each value in a column of the global mapping table corresponds to an individual index value of a local partition index.

\* \* \* \* \*